UNITED STATES PATENT OFFICE.

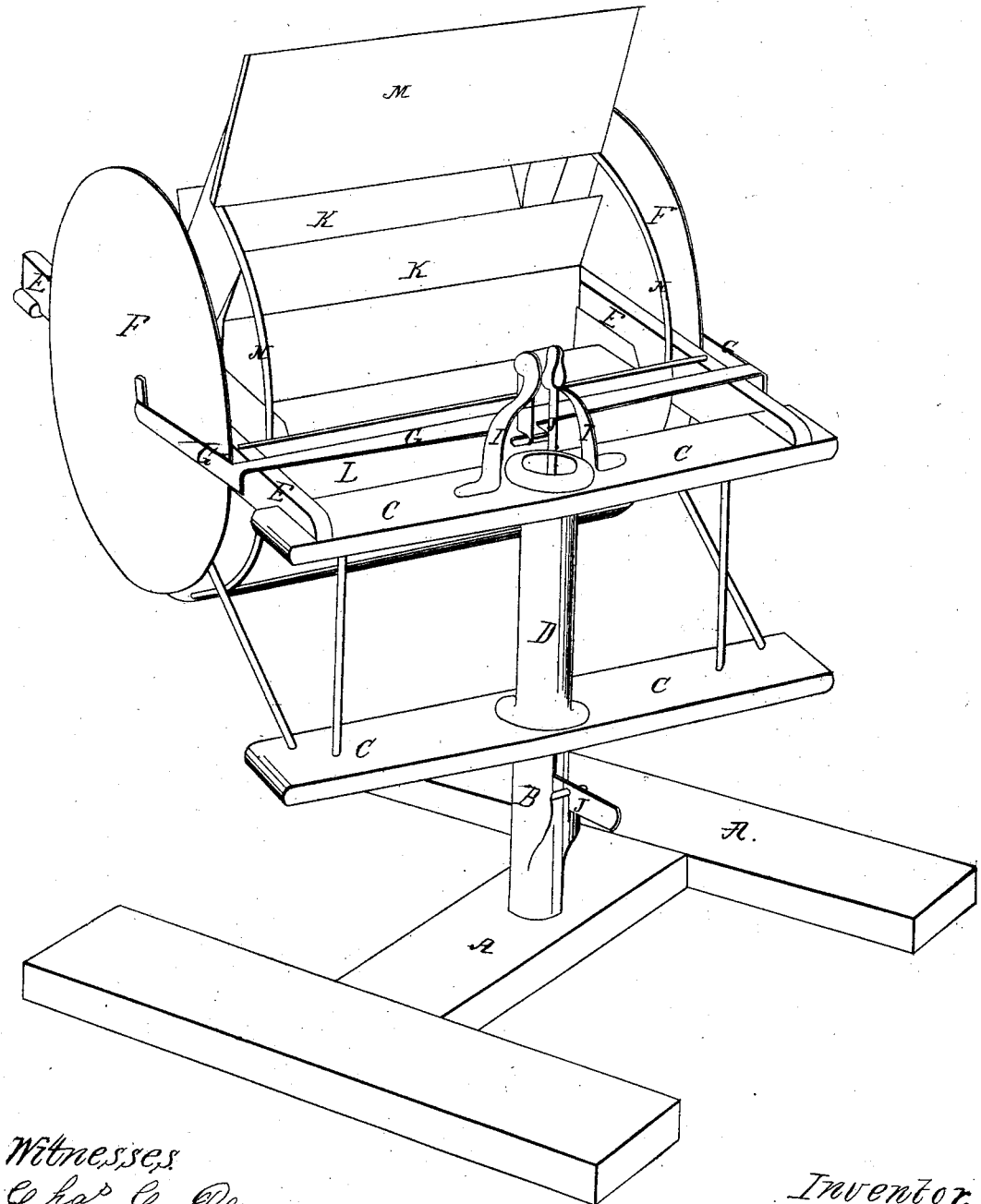

HENRY S. WENTWORTH, OF NAPOLEON, MICHIGAN.

SELF-REGULATING WIND-DIRECTOR FOR WINDMILLS.

Specification of Letters Patent No. 16,346, dated January 6, 1857.

*To all whom it may concern:*

Be it known that I, H. S. WENTWORTH, of Napoleon, in the county of Jackson and State of Michigan, have invented certain new and useful Improvements in the Construction of Windmills, of which the following description, illustrated by the accompanying drawing and references, is sufficiently clear and comprehensive to enable persons of competent skill to make and use my invention.

The drawing is a perspective view of whole windmill.

The nature of my invention relates to the mode of governing the wind mill in cutting off and supplying or admitting the wind by means of the rotary movement of a screen or semi-cylindrical curb surrounding the fans, which screen is operated by the action of the screen itself upon a separate receding fan.

The important features relating to the parts connected with the wind wheel and the mode of conveying power from the shaft of such wheel to the vertical rod which communicates it to the machinery and also in hanging the whole apparatus upon a revolving frame which shall assume its proper position with regard to the wind as specified. It will be readily perceived that my improvements may by slight changes be arranged and made to take a horizontal instead of a vertical form.

A is a base or foundation of my windmill which may be attached to the ground permanently or be placed on rollers with attachments for securing and fixing it in any place which may be desired. The hollow upright support B is affixed to it in a permanent manner, and supports the frame c and cylindrical socket D. The wind wheel K is hung horizontally on the arms E, with the ends of the shaft projecting beyond the disks F, F, and terminating in a crank at each end by which the vibrating frame G is operated. This frame gives motion to the bent lever supported by the bracket I, and by means of this lever communicates motion to the vertical connecting rod J which by means of the central fulcrum lever J', or other equivalent, communicates motion to any machinery desired.

The wind wheel K may have almost any form required the fans, being so constructed as to give the wind power to strike the upper portion of the wheel. It being prevented at any time from affecting the lower portion of the same by the semi-cylindrical screen L which partially incloses it, and is hung upon the same center with the wheel. This screen prevents the wind from striking the lower portion of the wheel, and when the force of the wind is so great as to drive the wheel too rapidly it overcomes the balancing-power of the semi-cylindrical screen by blowing upon the fan M, which is connected to it by the circular rod or hoops N, as the fan M is blown backward by an increase of the power of the wind it becomes inclined to its original perpendicular position and thus presents a less surface to the wind force and as such governing fan recedes from the wind it proportionally shuts off the current from the wind wheel. I thus gage the amount of wind power which I admit to the driving wind wheel by the same force exerted upon the balance fan M. The whole frame supporting the driving wheel and its attachments being hung entirely upon one side of the standard or support B it becomes free to revolve around it and take the side opposite the wind so as to keep the wheel K always in a proper position to receive the current and thus to avoid the necessity of a ram. The small pin arms which extend over upon the top of the frame arms E prevent the too great lateral or revolving swing of the screen, but keeps it in a proper position to be effected by the wind upon the extra fan as represented fully by the drawing.

I claim—

A semi-circular revolving balance screen L operated variably, as set forth, by the power of the wind upon the revolving extra fan M for the purpose of admitting only the requisite current of air to the wheel substantially as described, whether placed in a horizontal or vertical form as stated.

HENRY S. WENTWORTH.

Witnesses:
CHAS. C. DEWEY,
AUSTIN CHURCH.